O. A. WELLS.
METHOD OF DRAWING HOLLOW GLASS ARTICLES.
APPLICATION FILED OCT. 7, 1914.
1,301,771.
Patented Apr. 22, 1919.
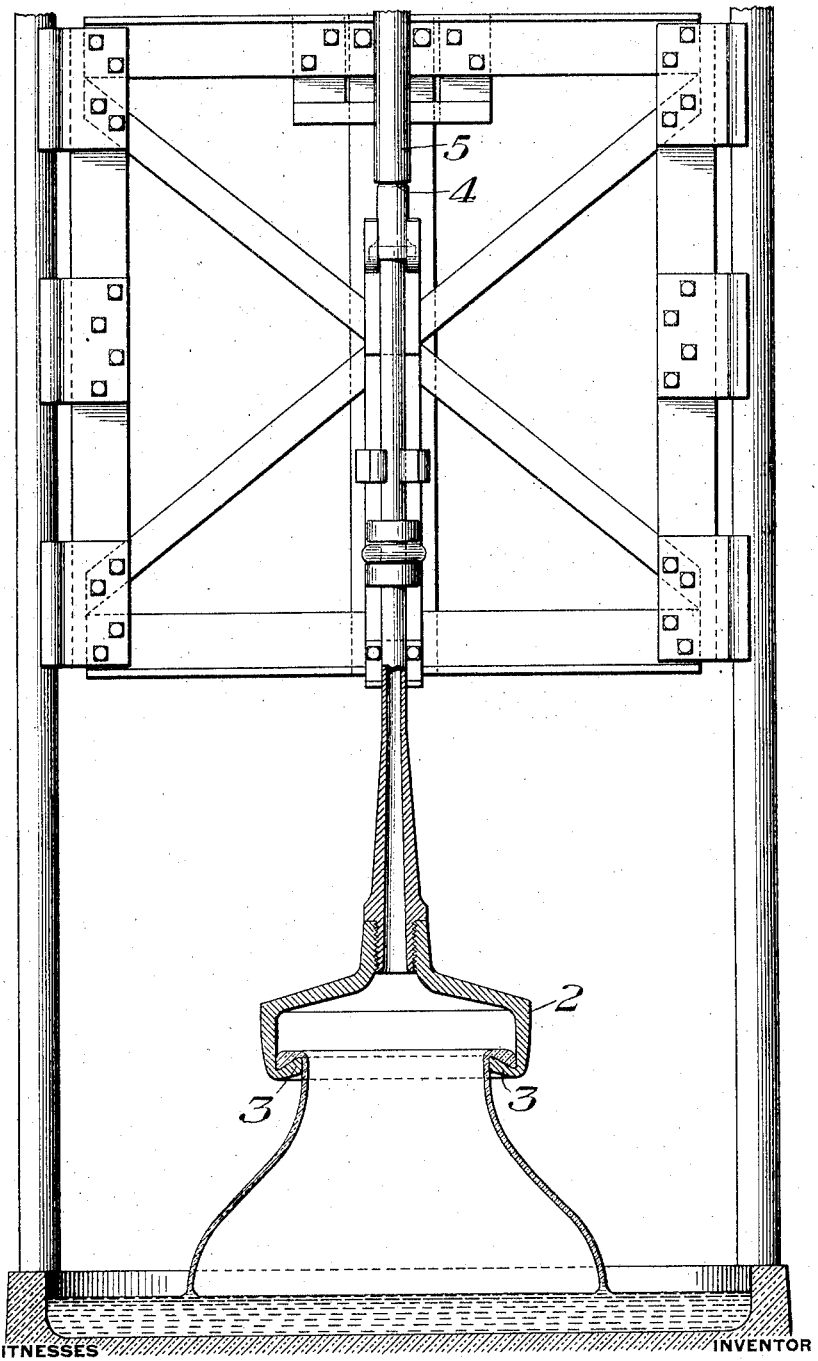

UNITED STATES PATENT OFFICE.

OTIS A. WELLS, OF ARNOLD, PENNSYLVANIA, ASSIGNOR TO WINDOW GLASS MACHINE COMPANY, OF PITTSBURGH, PENNSYLVANIA, A CORPORATION OF NEW JERSEY.

METHOD OF DRAWING HOLLOW GLASS ARTICLES.

1,301,771.     Specification of Letters Patent.     Patented Apr. 22, 1919.

Application filed October 7, 1914. Serial No. 865,490.

*To all whom it may concern:*

Be it known that I, OTIS A. WELLS, a citizen of the United States, residing at Arnold, in the county of Westmoreland and State of Pennsylvania, have invented a new and useful Improvement in Methods of Drawing Hollow Glass Articles, of which the following is a full, clear, and exact description, reference being had to the accompanying drawings, forming part of this specification, in which the figure is an elevation, largely conventional, illustrating the practice of my invention.

My invention has relation to the drawing of hollow glass articles, such as window glass cylinders or rollers, and is designed to provide a more efficient and economical method of this character.

Prior to my invention, hollow glass articles have been drawn by either one of two general methods. One of these methods is known as the "hot bait" method, the bait being preheated to a temperature sufficiently high to cause the molten glass in which it is immersed to make the draw, to actually fuse or weld to the metal of the bait, and the glass being held to the bait during the draw by this fusion or welding.

In the other method, known as the "cold bait" method, the bait is used at a temperature at or slightly above atmospheric temperature when immersed in the molten glass. A supporting head or novel is formed, usually within the interior of the cold bait, by the chilling action of the bait upon the glass in which it is immersed. The bait is withdrawn from the glass before it has had time to attain a temperature approaching that of the glass and before the heat from the glass has time to penetrate the metal of the bait. Consequently, the bait is at a temperature lower than the novel. In this method, as the bait moves upwardly during the draw, it continues for some time to increase in temperature, thus causing it to expand. In the meanwhile, the novel of glass, initially at a much higher temperature, cools and consequently contracts. The result of these expansion and contraction movements is to produce a novel which, at the conclusion of the draw, is quite loose in the bait.

The hot bait method has been largely used with commercial success, but is open to several objections. The actual fusion or welding of the glass to the metal of the bait requires extensive cleaning operations to remove the glass from the bait at the conclusion of each draw, in order to prepare the bait for another draw. This results in rapid wear of the baits. It is also necessary after cleaning the baits to preheat them to a relatively high temperature before again using them. This method is also open to the objection that unless some special means are provided for retaining the initial heat in the bait, the length of cylinders which can be drawn is somewhat limited.

For these reasons, the hot bait method has been latterly superseded to a considerable extent by the cold bait method. This, however, is also open to certain objections in practice. One of these objections consists in the fact that, by reason of the degree of looseness between the glass novel and the adjacent surfaces of the bait, considerable breakage occurs in the taking down and handling of the cylinders, due to relative movements between the baits and the novels which cause breaking strains to occur.

Among other objections to the cold bait method are the following: It produces a variable air outlet by reason of the looseness of the novel, thereby causing an irregular pressure upon the cylinder, resulting in "bumpy" rollers. The irregular expansion and contraction of the glass and bait during the draw causes the cylinders to break frequently. It is necessary to cover the outside of the bait with grease or some other preparation, such as paraffin. Some method of cooling is also required. The application of grease to the outside increases the liability of grease getting into the lip while the novel is forming, and thus increases the number of imperfect draws. The grease also causes dirt to adhere to the bait, causing streaks of thin and thick glass in the cylinders. Greater skill is required in the manipulation to prevent breakage, thick and thin glass, etc.

I have discovered that better results can be obtained and the method made much more economical and efficient by using baits which are at a temperature intermediate to those employed in the hot and cold methods above referred to.

In accordance with my invention, the baits are held in the molten glass until they have attained a temperature more nearly approaching that of the glass, but which is below that at which the glass will fuse to the bait. At the beginning of the draw, the glass is at a higher temperature than the bait, but its coefficient of contraction is considerably less than that of the metal of the bait. The bait, on the other hand, starts at an initially lower temperature, but has a relatively higher coefficient of contraction. During a portion, at least, of the draw, the bait continues to increase in temperature by transfer of heat from the glass as well as from heat received from the body of molten glass from which the draw is proceeding or from the heated pot or furnace containing the same. Therefore, during the draw, the temperature of the glass novel is varied to a greater extent than the temperature of the bait, but as the coefficient of contraction of the glass is lower than that of the bait, the result is that there is but little change in the relative diameters of the bait and glass novel. At the close of the draw, therefore, the novel is tight within the bait, there being no appreciable looseness between the engaging surfaces of the two.

The exact method of carrying out my invention will necessarily depend upon a number of variable conditions, such as the character of the metal or alloy employed in the baits, the length to which it is desired to draw the articles, and other factors well known in the art. Preferably, although not necessarily, the baits are at a temperature considerably above room temperature at the time they are immersed in the molten glass. I have obtained good results by immersing the bait at a temperature of from 200 to 300 degrees F., but this may be considerably varied. The time during which the bait should be held immersed in the glass will depend upon the thermal conductivity of the bait, its weight or mass, its shape and the temperature at which it is immersed, that is, whether preheated or not. The time depends also upon the temperature and viscosity of the molten glass. With an iron or steel bait having a temperature of from 200 to 300 degrees F., I obtain good results by holding the bait immersed for a period of about one minute. As above stated, however, these directions are purely illustrative and may be widely varied by the individual operator to suit particular conditions in each case. It appears to be essential that the bait at the beginning of the draw shall be heated to a temperature short of the temperature at which fusion of the glass thereto would occur, but which is sufficiently high to maintain substantially the same relation between the bait and the glass throughout the draw. Obviously, the bait may be handled in various ways to secure this result.

When the bait is somewhat preheated before being immersed in the glass, this preheating may be done in any desired way, although I prefer that the portion of the bait which is afterward dipped should be substantially uniformly heated throughout. For instance, the bait may be hung above the pot or other drawing vessel in sufficiently close proximity to the glass to be heated by radiation therefrom. The baits may also be used at sufficiently short intervals between successive draws so that they will not have entirely lost the heat obtained during the previous draw.

I preferably employ a bait of the general hollow form used in the cold bait method and having an interior supporting surface for the glass novel. Such a bait is indicated at 2 in the accompanying drawing. The novel-supporting surface may be of any suitable character. Preferably, it is of grooved or hook form, as indicated at 3. This gives a better holding action on the glass. The baits may also be made of any suitable material, although one of the advantages of my invention is that it enables the use without difficulty of iron and steel baits. These are less expensive than copper or alloy baits, and are of much greater durability than copper baits. They are also not subject to so much expansion and contraction as copper baits.

The general operation of drawing of glass articles in accordance with my invention is similar to that of the hot and cold bait methods. The bait is immersed in the glass to about the usual depth and is drawn upwardly in the usual manner, air being admitted to the interior of the cylinder during the draw according to the usual method. Preferably some air is admitted to the bait while it is immersed in the glass, as a slight air pressure will assist in flowing glass properly into the anchorage groove or recess of the bait. It is possible, however, to form the novel without the admission of any air, since the length of time during which the bait is immersed is sufficient to enable the glass to flow into and fill said groove or recess. The extent to which air is admitted after the formation of the novel and during the formation of the neck and cap portions of the article may be in accordance with the usual methods and depending upon the judgment of the operator or the particular shape of neck and cap which it is desired to form and the temperature and physical properties of the molten glass. Too rapid cooling of the bait may be prevented by the use of suitable inclosures or shields.

My invention utilizes in a highly beneficial way the counterbalancing differential contractions of the glass and metal during the draw, so that there is very little if any relative change in the relative dimensions of the engaging parts of the bait and glass. Therefore, at the conclusion of the draw, the glass is tight in the bait, and when the freshly drawn cylinder is swung outwardly in the taking down operation, instead of there being a movement of the glass novel and neck within the bait of a character to cause strains and breakage, the bait and glass swing rigidly as a unit from the joint 4 in the air pipe 5 connected to the bait. This greatly reduces the breakage in the taking down operation, as will be readily apparent. There is also less breakage due to excessive contraction during the draw. The tight joint between the noval and bait prevents escape of air at this point during the draw, thus insuring a more uniform air supply with less manipulation of the air control.

The practice of my invention results in the formation of a better hood or novel, not only because of the time interval during which the bait is immersed in the glass, but also because the glass does not chill as suddenly when the bait is immersed in the glass as is the case with a cold bait. My invention also requires the use of fewer baits for each drawing operation, owing to the fact that each bait can be again used before it has been entirely cooled off, and no expenditure of energy is required in either heating or cooling the bait before use. Furthermore, my invention largely obviates the tendency of glass to cling to the outside of the bait, since the hotter the bait, the heavier is this ring. The life of the baits is also somewhat increased, since they are not subjected to such extreme temperature changes.

While as above stated, the hood or novel is relatively tight with respect to the bait at the conclusion of the draw, yet there is no fusion between the glass and the bait, and the neck and novel can readily be broken and removed from the bait.

I claim:

1. In the art of drawing hollow glass articles from a molten bath by the use of a bait having a temperature below that at which the glass would fuse thereto, the method of preventing relative movement between the engaging portions of the bait and article, which consists in heating the bait while forming the novel and before it is withdrawn from the molten glass bath to a temperature below that at which the glass will fuse thereto, and which is sufficiently high to cause the radial contraction of the bait during the draw to be substantially equal to that of the glass novel, substantially as described.

2. In the art of drawing hollow glass articles from a molten bath by the use of a bait having a temperature below that at which the glass would fuse thereto, the method of preventing relative movement between the engaging portions of the bait and article, which consists in heating the bait while forming the novel and before it is withdrawn from the molten glass bath to a temperature below that at which the glass will fuse thereto, and which is sufficiently high to cause the radial contraction of the bait during the draw to be substantially equal to that of the glass novel, and regulating such temperature in accordance with the length of the article to be drawn, substantially as described.

3. In the art of drawing hollow glass articles, the method which comprises using a heated bait having a temperature below that at which glass will fuse thereto, but high enough to have substantially the same radial contraction during the draw as that which occurs in the novel of the glass article being drawn, substantially as described.

4. In the art of drawing hollow glass articles, the method which comprises dipping a hollow bait having an interior novel-supporting surface into a body of molten glass and forming a novel on such surface, and retaining the bait within the glass before withdrawal until it has attained a temperature below that at which the glass will fuse thereto, but which is sufficiently close to the temperature of the glass novel to have substantially the same amount of radial contraction as the novel during the draw, and then drawing, substantially as described.

5. The method of drawing hollow glass articles with a bait having an internal glass-supporting surface, which consists in heating the bait prior to the time that it is withdrawn from the glass bath in which it is immersed to start the draw to a temperature below that at which glass will fuse thereto and sufficiently high to cause the radial contraction of the bait during the draw to be substantially equal to that of the glass novel, substantially as described.

6. The method of drawing hollow glass articles from a bath of molten glass, which consists in using a hollow bait having an opening at one end and having a reëntrant flange surrounding said opening, said flange having a substantially vertical article-engaging wall, and heating said bait before it is withdrawn form the glass bath to a temperature below that at which the glass will fuse thereto and which is sufficiently high to cause the radial contraction of the bait during the draw to be substantially equal to that of the glass novel, substantially as described.

7. The method of drawing hollow glass articles from a bath of molten glass, which consists in using a hollow bait having an opening at one end and having a reëntrant flange surrounding said opening, said flange having a substantially vertical article-engaging wall and also having a depressed anchorage groove in its upper surface, and heating said bait before it is withdrawn from the glass bath to a temperature below that at which the glass will fuse thereto and which is sufficiently high to cause the radial contraction of the bait during the draw to be substantially equal to that of the glass novel, substantially as described.

8. In the art of drawing hollow glass articles, the method which comprises forming the neck or novel portion of the article upon a bait heated to a temperature below the point at which fusion of the glass to the bait will occur, and maintaining temperature relations between the bait and the novel during the draw which will prevent substantial change in the size relations of the engaging portions of the bait and novel, substantially as described.

In testimony whereof I have hereunto set my hand.

OTIS A. WELLS.

Witnesses:
E. H. THOMPSON,
L. C. HICKS.

Copies of this patent may be obtained for five cents each, by addressing the "Commissioner of Patents, Washington, D. C."